(12) United States Patent
Liu et al.

(10) Patent No.: US 12,535,004 B2
(45) Date of Patent: Jan. 27, 2026

(54) TUNNEL BORING MACHINE EQUIPPED WITH HIGH-PRESSURE WATER JET CUTTING SYSTEM AND COMBINED TUNNELING METHOD

(71) Applicant: SHANDONG UNIVERSITY, Shandong (CN)

(72) Inventors: Bin Liu, Jinan (CN); Biao Li, Jinan (CN); Bin Xu, Jinan (CN); Bo Zhang, Jinan (CN); Jiancheng Zhang, Jinan (CN); Hu Yu, Jinan (CN)

(73) Assignee: SHANDONG UNIVERSITY, Shandong (CN)

( * ) Notice: Subject to any disclaimer, the term of this patent is extended or adjusted under 35 U.S.C. 154(b) by 0 days.

(21) Appl. No.: 19/179,582

(22) Filed: Apr. 15, 2025

(65) Prior Publication Data
US 2025/0320818 A1    Oct. 16, 2025

(30) Foreign Application Priority Data
Apr. 15, 2024    (CN) .......................... 202410449769.5

(51) Int. Cl.
*E21D 9/10*    (2006.01)
*E21C 35/187*    (2006.01)
*E21D 9/11*    (2006.01)

(52) U.S. Cl.
CPC .......... *E21D 9/1066* (2013.01); *E21C 35/187* (2013.01); *E21D 9/112* (2013.01)

(58) Field of Classification Search
CPC ...... E21D 9/1066; E21D 9/112; E21C 35/187
See application file for complete search history.

(56) References Cited

FOREIGN PATENT DOCUMENTS

| CN | 110593888 A | 12/2019 | |
|---|---|---|---|
| CN | 111219195 A | 6/2020 | |
| CN | 112901191 A * | 6/2021 | ............ E21D 9/087 |
| CN | 112901199 A | 6/2021 | |

(Continued)

OTHER PUBLICATIONS

Dec. 9, 2024 Office Action issued in Chinese Patent Application No. 202410449769.5.

(Continued)

*Primary Examiner* — Janine M Kreck
(74) *Attorney, Agent, or Firm* — Oliff PLC (57) ABSTRACT

The invention discloses a tunnel boring machine (TBM) equipped with a high-pressure water jet cutting system and a combined tunneling method, comprising a TBM body, the water pump unit on the body, and the high-pressure water jet cutting system at the front end of the body. The high-pressure water jet cutting system comprises a water jet-mechanical combined cutter head, water jet-shell knife combined cutters, a high-pressure water pipeline, a multi-medium rotary center, and a water jet diversion valve block. The high-pressure water at the pump unit is transmitted to the multi-medium rotary center through the high-pressure water conveying pipeline, and then divided into multiple paths by the water jet diverter valve block, and respectively supplied to each of the combined cutters on the water jet-mechanical combined cutter head. This invention offers practical suggestions and references for the overall design, and spatial arrangement of the high-pressure water jet cutting system.

8 Claims, 3 Drawing Sheets

(56) References Cited

FOREIGN PATENT DOCUMENTS

| | | | | |
|---|---|---|---|---|
| CN | 112901200 | A | 6/2021 | |
| CN | 114562285 | A | 5/2022 | |
| CN | 113202490 | B | 12/2022 | |
| CN | 115012970 | B | 3/2023 | |
| CN | 116988807 | A | 11/2023 | |
| EP | 1092836 | A2 * | 4/2001 | ........... E21D 9/0879 |
| JP | H09-132995 | A | 5/1997 | |

OTHER PUBLICATIONS

Jan. 23, 2025 Notification to Grant Patent Right for Invention issued in Chinese Patent Application No. 202410449769.5.

* cited by examiner

TUNNEL BORING MACHINE EQUIPPED WITH HIGH-PRESSURE WATER JET CUTTING SYSTEM AND COMBINED TUNNELING METHOD

CROSS-REFERENCES TO RELATED APPLICATIONS

The present invention claims priority benefits to from Chinese Patent Application number 202410449769.5, entitled "Tunnel Boring Machine Equipped with High-pressure Water Jet Cutting System and Combined Tunneling Method", filed on Apr. 15, 2024, with the China National Intellectual Property Administration, the entire contents of which are incorporated herein by reference and form a part of the present invention for all purposes.

TECHNICAL FIELD

The present invention belongs to the technical field of efficient tunneling, and particularly relates to a tunnel boring machine (TBM) equipped with a high-pressure water jet cutting system and a combined tunneling method thereof.

BACKGROUND

The statements in this section merely provide background information related to the present invention and do not necessarily constitute prior art.

Commonly used tunneling methods are mainly divided into drilling and blasting method and TBM construction method. The drilling and blasting methods have low mechanization degree and mainly rely on manual operation of mechanical drilling and blasting to excavate tunnels, with high risk and long period. The TBM construction method has a high degree of mechanization. When tunneling in ordinary hard rock tunnels (holes), the daily footage can reach 30-40 m/d, which is 3-10 times the construction speed of drilling and blasting method, and it has significant advantages in the safety of field operators. However, when full-face TBM is tunneling under extremely complex geological conditions such as hard rock, ultra-hard rock and highly abrasive stratum, outstanding problems such as insufficient rock breaking ability of mechanical tools, aggravated tool loss and high ratio of tool replacement time often occurs, which seriously restrict the field construction efficiency.

In order to improve the rock-breaking ability of full-face TBM, many scientific research institutions and manufacturing enterprise in domestic and abroad have continuously carried out efficient rock-breaking research and provided many new rock-breaking methods. Among them, high-pressure water jet technology has the characteristics of environmentally friendly, low energy cost and high efficiency, and is easy to be realized, and has rich practical basis, so it is considered as a highly competitive rock breaking method. By using a combination of high-pressure water jet and mechanical tool rock breaking effect, the penetration of mechanical tool may be increased, and the wear rate of tool may be reduced, and the tunneling efficiency may be greatly improved. Therefore, high-pressure water jet assisted rock breaking technology has high research and application value in the field of efficient tunnel excavation.

According to the investigation, there have been patents related to high-pressure water jet assisted shield boring machine, such as "a shield boring machine pile cutting cutter head with high-pressure water jet cutting system" published with the publication number CN115012970B, which proposes a water jet-mechanical combined cutter head, considering the protection of a bit of the water jet cutter and designing a device for protecting the water jet cutter. The publication number CN113202490B "a water jet rotary joint for shield boring machine" proposes a rotary joint for rotating multiple medium.

However, the above prior arts still have the following problems:

1) The overall design, optimization and spatial arrangement of the high-pressure water jet cutting system from pump unit to cutter head have not been considered.
2) There is no miniaturized and integrated multi-medium rotary center for simultaneously rotating and transmitting the medium required by the TBM and the medium required by the high-pressure water jet cutting system, resulting in low reliability and practicability of the rotary center.
3) A device for reliably and effectively protecting water jet cutter bit and related protection measures have not been proposed.
4) The spatial arrangement of the water jet cutter bit on the cutter head of the TBM lacks theoretical guidance, which makes it difficult to achieve the optimal mechanical gain effect of high-pressure water jet.

SUMMARY

In order to solve the above problems, the invention provides a TBM equipped with a high-pressure water jet cutting system and a combined tunneling method, which provides practical suggestions and references for the overall design, optimization and spatial arrangement of the high-pressure water jet cutting system.

According to some embodiments, the present invention adopts the following technical solutions.

A TBM equipped with a high-pressure water jet cutting system, including a TBM body, a flow pump unit is arranged on the TBM body, and a high-pressure water jet cutting system is arranged at a front end of the TBM body; wherein
the high-pressure water jet cutting system includes a water jet-mechanical combined cutter head, a plurality of water jet-shell knife combined cutters, a high-pressure water conveying pipeline, a multi-medium rotary center and a water jet diversion valve block; wherein, a first end of the high-pressure water conveying pipeline is connected to the flow pump unit, and a second end of the high-pressure water conveying pipeline is connected to the multi-medium rotary center, the multi-medium rotary center is connected to the water jet diversion valve block, wherein high-pressure water is divided by the water jet diversion valve block into multiple paths, and is respectively supplied to each of the plurality of the water jet-shell knife combined cutters on the water jet-mechanical combined cutter head.

As an alternative implementation mode, the water jet-mechanical combined cutter head includes a cutter head body, a plurality of center cutters arranged in a certain range at a center position of the cutter head body, a plurality of edge cutters are arranged at an edge of the cutter head body, and the water jet-shell knife combined cutters; wherein
the plurality of the water jet-shell knife combined cutters is configured to: some of the plurality of the water jet-shell knife combined cutters which are close to the center position of the cutter head body are positioned at a concentric circle where the center cutters locating, so that a cutting trajectory of the water jet-shell knife combined cutters is the same as that of the center cutters; and the others of the plurality of the water jet-shell knife combined cutters which are close to an edge position of the cutter head body are arranged at different positions from each of the edge cutters, so that a cutting trajectory of the others of the water jet-shell knife combined cutters is different from that of the each of the edge cutters.

As a further implementation mode, a plurality of the water jet-shell knife combined cutters is additionally arranged at vulnerable positions of the cutter head body.

As an alternative implementation mode, a water jet-shell knife combined cutter includes a shell knife, a water jet cutter bit and a buffer material, wherein a groove is provided in the shell knife and an internal thread is provided in the shell knife; an external thread is provided in a cutter rod of the water jet cutter bit; the water jet cutter bit is embedded in and fixedly connected to the shell knife through the threads; and a high-pressure water jet outlet of the water jet cutter bit is arranged at an end surface of the shell knife.

As a further implementation mode, pores between the shell knives and the water jet cutter bits are filled with the buffer material.

As an alternative implementation mode, the multi-medium rotary center includes a water jet rotary joint and a low-pressure medium rotary center, wherein the water jet rotary joint is arranged at an axis position of the low-pressure medium rotary center.

As a further implementation mode, the low-pressure medium rotary center includes a low-pressure medium input hole, a fixed portion of the low-pressure medium rotary center, a rotating portion of the low-pressure medium rotary center and a low-pressure medium conveying pipeline, wherein the fixed portion of the low-pressure medium rotary center is arranged outside the rotating portion of the low-pressure medium rotary center, a sealing ring is arranged between the fixed portion of the low-pressure medium rotary center; a relative rotation is allowed between the fixed portion of the low-pressure medium rotary center and the rotating portion of the low-pressure medium rotary center; the low-pressure medium input hole is opened at the fixed portion of the low-pressure medium rotary center and is used for inputting external low-pressure medium; and, the low-pressure medium conveying pipeline is provided inside the rotating portion of the low-pressure medium rotary center and is used for outputting low-pressure medium flowing through the low-pressure medium rotary center.

As a further implementation mode, an abrasive conveying system is connected to the rotating portion of the low-pressure medium rotary center, and the abrasive conveying system includes a sand container, a connecting flange, a sand inlet, an air inlet, a sand discharge port and an abrasive conveying pipeline; wherein, one side of the sand container is sleeved on an outer side of the rotating portion of the low-pressure medium rotary center, a sealing ring is disposed between the sand container and the rotating portion of the low-pressure medium rotary center, and a relative rotation is allowed between the sand container and the rotating portion of the low-pressure medium rotary center; another side of the sand container is fixedly connected to the fixed portion of the low-pressure medium rotary center through the connecting flange; the sand inlet and the air inlet are placed at a top end of the sand container and are respectively configured for adding abrasives to an interior of the sand container and balancing the air pressure; the sand discharge port is placed at a bottom of the sand container; and, the abrasive conveying pipeline is placed inside the rotating portion of the low-pressure medium rotary center, and a first end of the abrasive conveying pipeline is connected to the interior of the sand container.

As a further implementation mode, the water jet rotary joint comprises a fixed portion of the water jet rotary joint and a rotating portion of the water jet rotary joint; the high-pressure water conveying pipeline is directly connected to the fixed portion of the water jet rotary joint, and the rotating portion of the water jet rotary joint is connected to the water jet diversion valve block through the high-pressure water conveying pipeline.

As an alternative implementation mode, the flow pump unit is driven by a variable-frequency motor whose rotation speed can be adjusted step by step; meanwhile, a pilot overflow valve is mounted at an outlet of the flow pump unit; the pilot overflow valve is configured to be firstly energized for unloading before the flow pump unit is started; and when the flow pump unit reaches preset pressure and flow values, the pilot overflow valve is de-energized for loading.

As an alternative implementation mode, a pressure gauge is mounted on a water-supply pipeline of the water jet cutter bit, an induction coil assembly is mounted on a sand-supply pipeline, and a wireless transmission module is connected to the induction coil assembly. When water leakage or other abnormal damage occurs, the pressure at the water cutter may drop rapidly, and the working state of the water cutter may be fed back in real time through the pressure gauge. In addition, in order to detect whether sand is discharged from the sand-supply pipeline normally, first mixing steel balls with abrasive thoroughly, then adding the mixer (sand) to the sand container, then when sand is discharged from the sand-supply pipeline normally, the steel balls pass through the induction coil assembly to cause a change of inductive reactance of a coil in the induction coil assembly; and, the wireless transmission module is used for capturing the change of inductive reactance of the coil in the induction coil assembly and converting the change of inductive reactance into a detection signal with frequency changing along with the change of inductive reactance to be wirelessly conveyed to a terminal.

When the frequency becomes larger, it indicates that a flow rate of supplying of the abrasive mixed with the steel balls is larger, and when the frequency becomes smaller, it indicates that the flow rate of supplying of the abrasive mixed with the steel balls is smaller.

As an alternative implementation mode, a dyeing-agent mixing device is further provided, the dyeing-agent mixing device is communicated with an inside of a water tank through a water pump and a connecting pipeline, and a ratio of a discharge of the water pump to a discharge of the flow pump unit is the same as a ratio of the dyeing agent to the water.

A combined tunneling method based on the TBM mentioned above, including the following steps:
  selecting and switching to a target rock breaking mode according to a working condition; wherein, the target rock breaking mode includes:
    a mechanical tunneling-type rock breaking mode: a flow pump unit is not working, a high-pressure water conveying pipeline has no high-pressure water conveyed to a multi-medium rotary center, a water jet-mechanical combined cutter head rotates and propels, to carry out the rock breaking only by mechanical cutters;
    a water jet cutting-type rock breaking mode: the flow pump unit works and generates high-pressure water, the high-pressure water is conveyed to the multi-medium rotary center through the high-pressure water conveying pipeline, then is divided into required multi-path medium through a water jet diversion valve block, and then is conveyed to each of water jet-shell knife combined cutters at a cutter head position, the water jet-mechanical combined cutter head stops rotating, and carrying out the rock breaking only by water jet; or a high-pressure water jet-mechanical combined rock breaking mode: the flow pump unit works and generates high-pressure water, the high-pressure water is conveyed to the multi-medium rotary center through the high-pressure water conveying pipeline, then is divided into the required multi-path medium through the water jet diversion valve block, and then is conveyed to the water jet-shell knife combined cutters at the cutter head position; and, the water jet-mechanical combined cutter head rotates and propels, carrying out the rock breaking by a mode of high-pressure water jet-mechanical combination.

As an alternative embodiment, an energy distribution form of the high-pressure water is able to be changed by replacing the water jet cutter bit, and rock breaking parameters of the water jet are able to be adjusted by adjusting the flow pump unit.

Compared with the prior art, the present invention has the beneficial effects that:

According to the present invention, a complete set of high-pressure water jet cutting system mounted on the TBM is created, theoretical and technical problems of the high-pressure water jet cutting system in the actual TBM mounting process are solved, and practical suggestions and references are provided for the overall design, optimization and spatial arrangement of the high-pressure water jet cutting system. Greatly improving the efficiency of engineering construction, saving time and economic cost of site construction are realized.

According to the present invention, an ultra-high pressure and ultra-large flow pump unit introduced is driven by a variable-frequency motor whose rotation speed is able to be adjusted step by step, and a pilot overflow valve is arranged at the outlet of the pump unit. Before the ultra-high pressure and ultra-large flow pump unit is started, the pilot overflow valve is firstly energized and unloaded, and when the pump unit reaches the preset pressure and flow value, the pilot overflow valve is de-energized and loaded. The whole control system is able to greatly reduce the pressure fluctuation in the process of starting the pump unit, and protect each component from damage, and further reduce the construction risk on the premise of ensuring the effect of rock breaking and pile cutting.

According to the present invention, pressure difference between high-pressure water medium (generally more than dozens of MPa) and other medium (generally less than 10 MPa) is fully considered, and a water jet rotary joint for rotary transmission of high-pressure water and a low-pressure medium rotary center for rotary transmission of other medium are proposed. Further, the water jet rotary joint is arranged at an axial position of the low-pressure medium rotary center, and the combination of the water jet rotary joint and the low-pressure medium rotary center forms a miniaturized and integrated multi-medium rotary center which is capable of simultaneously rotating and transmitting the medium required by the TBMs and the medium required by the high-pressure water jet cutting system. For the generation and transmission of the high-pressure water, the high-pressure water is generated by ultra-high pressure and ultra-large flow pump unit placed on a trailer, conveyed to the fixed portion of the water jet rotary joint through high-pressure water conveying pipeline, and then conveyed to the water jet diversion valve block through the rotating portion of the water jet rotary joint. The water jet diversion valve block may divide one path of the high-pressure water into required multi-path of water, further reducing the size of the rotary center, and finally the high-pressure water is conveyed to the water jet cutter bit at the cutter head position through pipeline. What needs to be specifically pointed out is that steel plates are welded along pipeline and at connection positions of the cutters and cutter bits for protection, and an observation door shall be reserved to protect people and objects in a cutter chamber. A variety of effective methods and facilities are set up to ensure the safe transmission of the high-pressure water jets. Other low-pressure medium, such as low-pressure cooling water, foam/bentonite, and the like required by the TBM, and abrasive, high-pressure air, and the like required by the water jet cutting system, are conveyed to the fixed portion of the low-pressure medium rotary center by the relevant conveying pipeline, and then conveyed to the corresponding diversion valve block through the rotating portion of the low-pressure medium rotary center, and then divided into the required multi-path medium and conveyed to the water jet cutter bit at the cutter head position. What needs to be specifically pointed out is that a periphery of the rotating portion of the low-pressure medium rotating center is sleeved with a sand container for storing abrasive. When the high-pressure water jet cutting system works, the high-pressure water forms negative pressure to absorb the abrasive in the sand container, and the abrasive is conveyed to the water jet cutter bit on the cutter head through the conveying pipeline.

In the process of rock breaking of the TBM, the cutter head directly contacts the rock and breaks the rock, and the cutter head will be subjected to great impact and abrasion. Therefore, the water jet cutter bit needs to be equipped with safe and reliable protective devices. According to the present invention, the water jet cutter bit is embedded in the shell knife as the water jet-shell knife combined cutter, and the combined cutter not only has the original scraping effect of the shell knife, but also can effectively protect the water jet cutter bit. In addition, in order to further improve the reliability and service life of the combined cutter, the pores between the water jet cutter bits and the shell knives are filled with buffer materials, and the damage of the water jet cutter bit caused by the vibration in rock breaking of the cutter is greatly reduced.

According to the present invention, the difficult problems that the working state of the water jet mounted on the cutter head of the TBM cannot be acquired in real time and the position of the damaged water jet cannot be accurately found are fully considered, a pressure gauge is arranged on a water-supply pipeline of each of the water jet cutter bit, and an induction coil assembly is arranged on a sand-supply pipeline of each of the water jet cutter bit. When water leakage or other abnormal damage occurs, the pressure at the water cutter will drop rapidly, and the working state of the water cutter can be fed back in real time through the pressure gauge. In addition, in order to detect whether sand is discharged from the sand-supply pipeline normally or not, the small steel balls are fully mixed with abrasive and then added to the sand container; when sand is discharged from the sand-supply pipeline normally, the small steel balls pass through the induction coil assembly to cause inductive reactance change of the coil in the induction coil assembly;

and the wireless transmission module is used for capturing the inductive reactance change of the induction coil assembly and converting the inductive reactance change into a detection signal with frequency changing along with the change of the inductive reactance to be wirelessly conveyed to a terminal. Further, when the frequency becomes large, it means that a supply flow rate of the abrasive doped small steel balls is large, and when the frequency becomes small, it means that the supply flow rate of the abrasive doped the small steel balls is small.

Further, the present invention provides a dyeing-agent mixing device, wherein a water pump is used for inputting dyeing-agent into a water tank, the ratio of the discharge of the water pump to the discharge of the ultra-high pressure and ultra-large flow pump unit is the same as the ratio of dyeing-agent to water, so that the dyeing-agent can be fused according to an optimal proportion; and the water tank is provided with a stirring rod, so that the dyeing-agent and water can be mixed rapidly. Colored residues are left when the dyeing-agent mixed liquid passes through the damaged or leaking parts of flexible pipes, rigid pipes and high-pressure pipeline joints, which are convenient for timely detection and leakage detection, so as to avoid personal injury and equipment damage caused by continuous pipeline rupture and joint disconnection.

According to the present invention, the problems of cutter stress, rock breaking efficiency and service life of different positions of the combined cutter head are fully considered. Considering that the cutter spacing of the center cutters is larger and the force on the cutter is obviously higher than that on other positions, the water jet cutter bit and the center cutters are arranged in the same trajectory to improve the force on the cutter. Considering that the force on the edge cutters is relatively small, the water jet cutter bit and the edge cutters are arranged in different trajectory to improve the rock breaking efficiency of the cutter head. In addition, an easily damaged position of the cutter head of the TBM is obtained by an on-site measurement and statistical method, and more standby water jet cutters are added at this position to improve the service life of the cutter head.

In order to further improve that rock-breaking efficiency of the water jet assisted mechanical rock breaking, the cutter head is divided into a plurality of zones, each zone is respectively configure with a cutter pressure sensor, signals of the cutter pressure sensor are collected and recorded when the TBM works; when the collected signal value is greater than a set value, the cutter head is automatically judged to rotate to the angle of each zone, a corresponding water switch positioned behind the water jet cutter is opened, and the water jet cutter bit of each zone emits high-pressure water jets; at the same time, a plurality of standby water jet cutter bits are arranged at the cutter head to improve the reliability of the water jet cutting system and further ensure the combined tunneling efficiency.

In order to make the above objectives, features, and advantages of the present invention more obvious and understandable, the following preferred examples are presented in detail with the accompanying drawings.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

Reference numerals in the drawings indicate the following:

1, trailer; 2, ultra-high pressure and ultra-large flow pump unit; 3, high-pressure water conveying pipeline; 4, multi-medium rotary center; 5, water jet diversion valve block; 6, water jet-shell knife combined cutter; 7, water jet-mechanical combined cutter head; 8, water switch;

21, inlet of pump unit; 22, dyeing-agent inlet of the pump unit; 23, stirring rod; 24, pilot overflow valve;

41, water jet rotary joint; 411, fixed portion of water jet rotary joint; 412, rotating portion of water jet rotary joint; 413, high-pressure water conveying pipeline; 42, low-pressure medium rotary center; 421, fixed portion of low-pressure medium rotary center; 422, rotating portion of low-pressure medium rotary center; 43, connecting flange; 44, sand container; 441, sand inlet; 442, air inlet; 443, sand discharge port; 444, abrasive conveying pipeline; 45, low-pressure medium input hole; 46, low-pressure medium conveying pipeline; 47, cutter head connector;

61, shell knife; 62, water jet cutter bit; 621, thread; 622, high-pressure water jet outlet; 63, buffer material; 64, high-pressure water pressure gauge; 65, water conveying pipeline of water jet cutter bit; 66, induction coil assembly; 67, sand conveying pipeline of water jet cutter bit; 68, wireless transmission module;

71, center cutters; 711, trajectory of arranging combined cutters in center position of the cutter head; 72, edge cutters; 721, trajectory of arranging combined cutters in edge position of the cutter head.

DETAILED DESCRIPTION

The present invention will now be further described with reference to the accompanying drawings and examples.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "include" and/or "including" used in this specification indicate that there are features, steps, operations, devices, components, and/or combinations thereof.

Example 1

A TBM equipped with a high-pressure water jet cutting system, including:

an ultra-high pressure and ultra-large flow pump unit 2, which is arranged on a certain trailer 1 of a full-section TBM, is a high-pressure water generating device required by a high-pressure water jet cutting system, and is driven by a variable-frequency motor of which frequency can be adjusted step by step; meanwhile, a pilot overflow valve 24 is arranged at an outlet of the pump unit, so that pressure fluctuation in a starting process of the pump unit is greatly reduced; and the high-pressure water generated by the ultra-high pressure and ultra-large flow pump unit 2 is conveyed to a multi-medium rotary center 4 through a high-pressure water conveying pipeline 3, and then is conveyed to each of water switches 8 through a water jet diversion valve block 5, and finally is conveyed to a water jet-shell knife combined cutter 6.

The multi-medium rotary center 4 includes a water jet rotary joint 41 and a low-pressure medium rotary center 42. The water jet rotary joint 41 is used for rotary transmission of the high-pressure water. The low-pressure medium rotary center 42 is used for rotating and conveying other low-pressure medium, such as low-pressure water, foam/bentonite, abrasive, high-pressure air, etc.

The water jet-shell knife combined cutter 6 includes a shell knife 61 and a water jet cutter bit 62. A groove is provided in the shell knife 61, the water jet cutter bit 62 is embedded in the groove of the shell knife 61, and an action surface of the water jet cutter bit 62 is exposed from a surface of the shell knife 61.

In addition, the water jet-shell knife combined cutter 6 is also equipped with a system for real-time monitoring working states of the water jet cutter bits and a system for detecting pipeline leakage.

A water jet-mechanical combined cutter head 7 includes: by fully considering the force on cutter, rock breaking efficiency and service life at different positions of the combined cutter head, carrying out a same trajectory arrangement for the water jet cutter bits 62 with the center cutters 71 to improve the force on cutter, and carrying out a different trajectory arrangement for the water jet cutter bits 62 with the edge cutters 72 to improve the rock breaking efficiency of the whole cutter head. In addition, a plurality of standby water jet cutters is added at the positions where the cutter head of the TBM is often damaged to improve the service life of the cutters.

Figure 1:
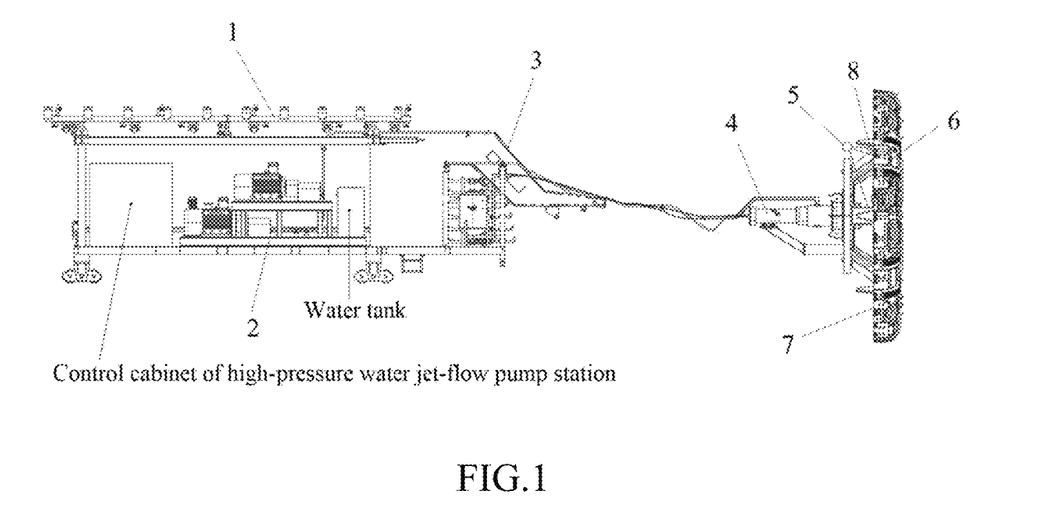
FIG. 1 is an overall schematic diagram of a TBM equipped with a high-pressure water jet cutting system according to an example of the present invention.
Figure 2:
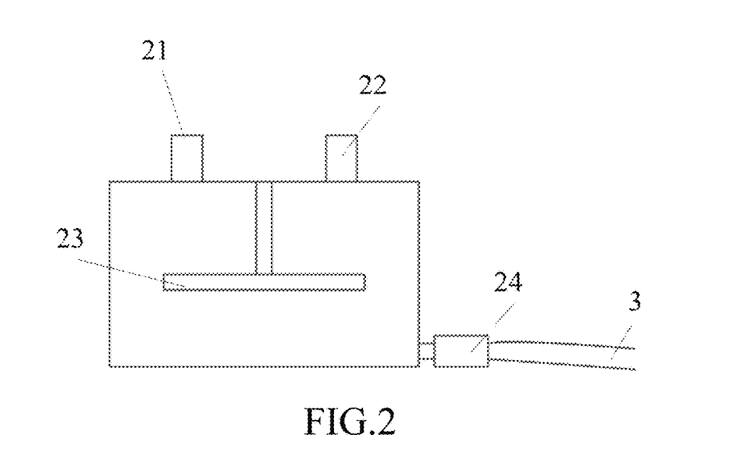
FIG. 2 is a schematic diagram of an ultra-high pressure and ultra-large flow pump unit shown in FIG. 1.

In some examples of the present invention, as shown in FIGS. 1 and 2, the ultra-high pressure and ultra-large flow pump unit 2 is a generation device for generating the high-pressure water required by the high-pressure water jet cutting system, and can perform a control and adjustment of the parameters such as pressure and flow rate as needed. Considering a spatial layout of the tunnel, the ultra-high pressure and ultra-large flow pump unit 2 is placed on the certain trailer 1 of the full-section TBM, and the generated high-pressure water is conveyed to the multi-medium rotary center 4 through the high-pressure water conveying pipeline 3.

In some examples of the present invention, as shown in FIGS. 1 and 2, the ultra-high pressure and ultra-large flow pump unit 2 is driven by a variable-frequency motor of which a rotational speed can be adjusted step by step, and a pilot overflow valve 24 is mounted at an outlet of the pump unit. Before the ultra-high pressure and ultra-large flow pump unit 2 is started, the pilot overflow valve 24 is firstly energized and unloaded, and when the ultra-high pressure and ultra-large flow pump unit 2 reaches the preset pressure and flow rate value, the pilot overflow valve 24 is de-energized and loaded. The whole control system cannot only greatly reduce the pressure fluctuation in the process of starting the pump unit, but also protect each component from damage, and further reduce the construction risk on the premise of ensuring the effect of rock breaking and pile cutting.

Figure 3A:
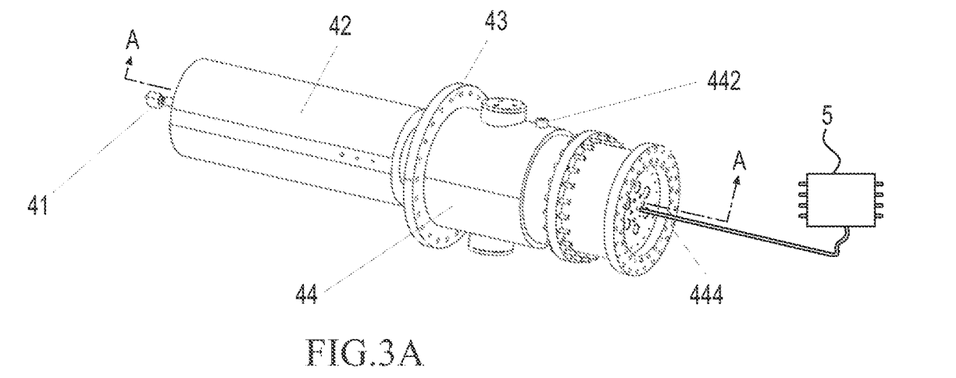
FIG. 3A is a schematic diagram of a multi-medium rotary center shown in FIG. 1.
Figure 3B:
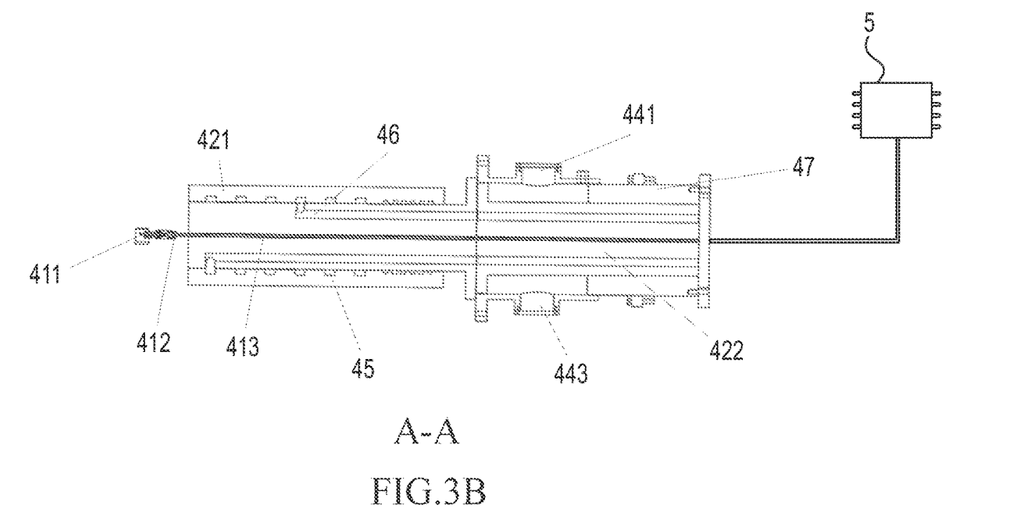
FIG. 3B is a sectional diagram of A-A of the multi-medium rotary center shown in FIG. 3A.

In some examples of the present invention, as shown in FIGS. 1 and 3, the multi-medium rotary center 4 is a core device of the high-pressure water jet cutting system, which can solve the "bottleneck" problem of static and dynamic separation of the rotation of the water jet-mechanical combined cutter head 7 and the stationarity of the pipeline at the transmission position of the ultra-high-pressure and ultra-large flow pump unit 2.

The high-pressure water flowing out of the multi-medium rotary center 4 is conveyed to the water jet diversion valve block 5, and then the high-pressure water is divided into multiple paths to be conveyed to the water switches 8, and finally supplied to the multiple water jet-shell knife combined cutters 6 on the cutter head for using. It should be specially noted that the steel plates are welded along the pipeline and at the connection of the cutters and cutter bits for protection, and an observation door shall be reserved to protect people and objects in a cutter chamber. A variety of effective methods and facilities are set up to ensure the safe transmission of high-pressure water jets. The water jet-mechanical combined cutter head 7 directly participates in rock breaking in the tunnel excavation process, and in order to reduce the force on cutters and improve the rock breaking efficiency, the influence of the spatial position of the water jet-shell knife combined cutter 6 is fully considered in the design process of the water jet-mechanical combined cutter head 7, and finally a novel efficient rock breaking cutter head which takes the force on cutters and rock breaking energy lose into account is obtained.

In some examples of the present invention, as shown in FIGS. 1 and 3, the present invention fully considers the pressure difference between high-pressure water medium (generally greater than tens of MPa) and other medium (generally less than 10 MPa), and excessive pressure difference leads to great difference in sealing grade between the two. In order to facilitate sealing and other designs, the present invention proposes a water jet rotary joint 41 for rotary transmission of high-pressure water and a low-pressure medium rotary center 42 for rotary transmission of other medium. Further, the water jet rotary joint 41 is disposed at the axial position of the low-pressure medium rotary center 42, and the combination of the low-pressure medium rotary center 42 and the low-pressure medium rotary center 41 constitutes a miniaturized and integrated multi-medium rotary center 4 which is capable of simultaneously rotating and transmitting the medium required by the TBM and the medium required by the high-pressure water jet cutting system.

In some examples of the present invention, as shown in FIGS. 1 and 3, a high-pressure water transmission system mainly includes a ultra-high pressure and ultra-large flow pump unit 2, a high-pressure water conveying pipeline 3, a water jet rotary joint 41, a water jet diversion valve block 5, a water switch 8, and the water jet-shell knife combined cutter 6. The ultra-high pressure and ultra-large flow pump unit 2 is a high-pressure water generating device, and the generated high-pressure water flows into the water jet rotary joint 41 through the high-pressure water conveying pipeline 3. The water jet rotary joint 41 includes a fixed portion of water jet rotary joint 411 and a rotating portion of water jet rotary joint 412. The high-pressure water conveying pipeline 3 is directly connected to the fixed portion 411 of the water jet rotary joint. The high-pressure water conveyed by the high-pressure water conveying pipeline 3 flows in from the fixed portion 411 of the water jet rotary joint and then flows out through a rotating portion 412 of the water jet rotary joint, realizing dynamic and static separation of the pipeline. After that, the high-pressure water flows into the water jet diversion valve block 5 through the pipeline 413, is divided into required multi-path medium, then is conveyed to the water switch 8, and is finally conveyed to the water jet-shell knife combined cutter 6 located at the cutter head position, thus completing the dynamic and static separation transmission of the high-pressure water from the ultra-high pressure and ultra-large flow pump unit 2 to the water jet-shell knife combined cutter 6.

In some examples of the present invention, as shown in FIGS. 1 and 3, other low-pressure medium transmission systems mainly include a low-pressure medium input hole 45, a low-pressure medium rotary center 42, and a low-pressure medium conveying pipeline 46. Further, the low-pressure medium rotary center 42 includes a fixed portion 421 of the low-pressure medium rotary center and a rotating portion 422 of the low-pressure medium rotary center. The low-pressure medium input hole 45 is opened at the fixed portion 421 of the low-pressure medium rotary center for inputting external low-pressure medium, such as low-pressure water, foam/bentonite, high-pressure air, etc.

The fixed portion 421 of the low-pressure medium rotary center is disposed outside the rotating portion 422 of the low-pressure medium rotary center, and a seal ring is disposed between the fixed portion 421 of the low-pressure medium rotary center and the rotating portion 422 of the low-pressure medium rotary center and allows a relative rotation between the fixed portion 421 of the low-pressure medium rotary center and the rotating portion 422 of the low-pressure medium rotary center. The low-pressure medium conveying pipeline 46 is opened inside the rotating portion 422 of the low-pressure medium rotary center, and is used for outputting the low-pressure medium flowing through the low-pressure medium rotary center 42.

Specifically, the external low-pressure medium is input to the fixed portion 421 of the low-pressure medium rotary center through the low-pressure medium input hole 45, and then flows through the low-pressure medium conveying pipeline 46 disposed inside the rotating portion 422 of the low-pressure medium rotary center, thereby realizing the static and dynamic separation of the pipeline. After that, the low-pressure medium is conveyed to the water jet-shell knife combined cutter 6 and the water jet-mechanical combined cutter head 7 through the relevant diversion valve, so that the static and dynamic-separation conveying of the low-pressure medium from the outside to the water jet-shell knife combined cutter 6 and the water jet-mechanical combined cutter head 7 is completed.

As an alternative solution, the abrasive conveying system mainly includes a sand container 44, a connecting flange 43, a sand inlet 441, an air inlet 442, a sand discharge port 443, and an abrasive conveying pipeline 444. The sand container 44 is sleeved on the outer side of the rotating portion 422 of the low-pressure medium rotary center, a sealing ring is arranged between the two and relative rotation is allowed, the left side is fixedly connected with the fixed portion 421 of the low-pressure medium rotary center through the connecting flange 43, and the sand container 44 is kept stationary at all times during operation. The sand inlet 441 and the air inlet 442 are disposed at the top of the sand container 44 for supplying abrasive material and balancing air pressure into the sand container 44, respectively. The sand discharge port 443 is arranged at the bottom end of the sand container 44 and is normally in a sealed state. When the abrasives inside the sand container 44 need to be replaced due to moisture or other reasons, the sand discharge port 443 can be opened to remove the abrasives inside the sand container 44 in time. The abrasive conveying pipeline 444 is disposed inside the rotating portion 422 of the low-pressure medium rotary center, and a first end of the abrasive conveying pipeline 444 is connected to the inside of the sand container 44, so that the abrasive can be conveyed from the inside of the sand container 44 to the outside. Specifically, the abrasive from the outside is added to the inside of the sand container 44 through the sand inlet 441 provided at the upper side of the sand container 44, during which the air inlet 442 is always kept open to balance the internal air pressure, and the sand discharge port 443 is always kept closed to prevent the abrasive from leaking. The abrasive in the sand container 44 is conveyed to the outside through the abrasive conveying pipeline 444, and then conveyed to the water jet-shell knife combined cutter 6 through the corresponding abrasive conveying pipeline, thus completing the static and dynamic-separation conveying of the abrasive from the outside to the water jet-shell knife combined cutter 6.

Figure 4:
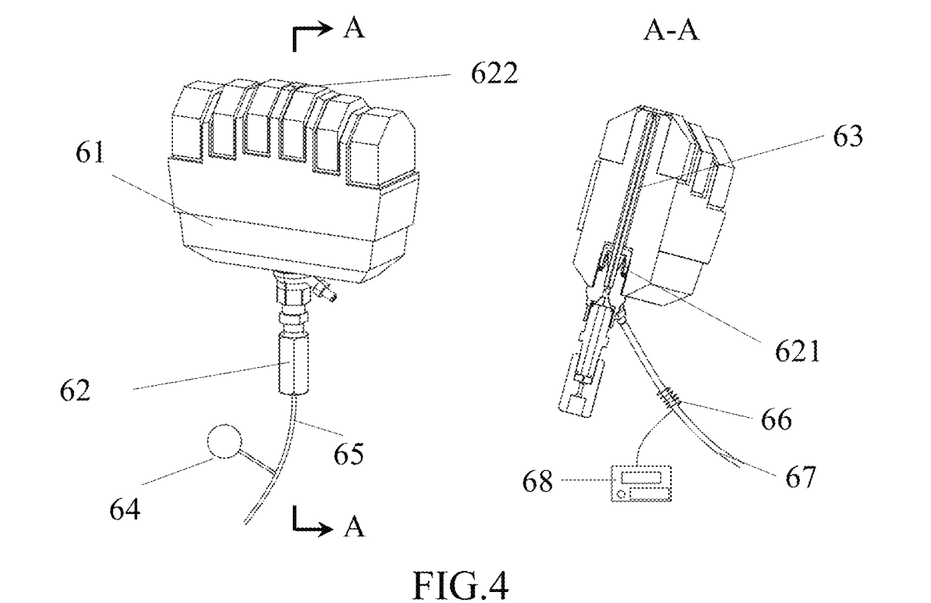
FIG. 4 is a schematic diagram of a structure of a water jet-shell knife combined cutter shown in FIG. 1.

In some examples of the present invention, as shown in FIGS. 1 and 4, the water jet-shell knife combined cutter 6 mainly includes a shell knife 61, a water jet cutter bit 62, threads 621, a high-pressure water jet outlet 622, and a buffer material 63. The shell knife 61 is internally provided with a groove and an internal thread 621, the cutter rod of the water jet cutter bit 62 is internally provided with an external thread 621 and embedded in the shell knife 61, and the shell knife 61 and the water jet cutter bit 62 are fixedly connected through the threads 621. In addition, the pores between the shell knife 61 and the water jet cutter bit 62 are filled with the buffer material 63, which greatly reduces the damage of the water jet cutter bit 62 caused by the vibration in rock breaking of the cutter.

The water jet-shell knife combined cutter 6 not only has the original scraping and rock breaking function of the shell knife 61, but also can effectively protect the water jet cutter bit 62, greatly improving the safety and reliability of the water jet cutter bit 62 in the rock breaking process of the full-section TBM.

In some examples of the present invention, as shown in FIGS. 1 and 4, the monitoring device for monitoring operating state of water jet cutter bit comprises a high-pressure water pressure gauge 64 and a water conveying pipeline 65 of the water jet cutter bit. The water conveying pipeline 65 is directly connected to the water jet cutter bit 62, and the high-pressure water pressure gauge 64 is mounted on the water conveying pipeline 65. As a further limitation, the pressure gauge is mounted on the water conveying pipeline 65 of each of the water jet cutter bits 62. When the water jet cutter bit 62 is working properly, the numerical reading of high-pressure water pressure gauge 64 is normally. When water leakage or other abnormal damage occurs to the water jet cutter bit 62, the pressure at the water jet cutter bit 62 will drop rapidly, and the working state of the water jet cutter bit 62 can be fed back in real time through the high-pressure water pressure gauge 64.

In some examples of the present invention, as shown in FIGS. 1 and 4, a monitoring device for monitoring the working state of a sand supply system comprises a induction coil assembly 66, a sand conveying pipeline 67 of water jet cutter bit, and a wireless transmission module 6. The sand conveying pipeline 67 of water jet cutter bit is directly connected to the water jet cutter bit 62 for conveying the abrasive. The induction coil assembly 66 is arranged outside the sand conveying pipeline 67 of water jet cutter bit and connected to the wireless transmission module 68. When it is necessary to test the sand production of sand conveying pipeline, small steel balls can be mixed with abrasive thoroughly before adding to the sand container. When sand is discharged from the sand-supply pipeline normally, the small steel balls pass through the induction coil assembly 66, thereby causing the inductance of the coil in the induction coil assembly 66 to change. The wireless transmission module 68 is configured to capture the change of inductive reactance of the induction coil assembly 66, convert the change of inductive reactance into a detection signal with a frequency varying with the inductance, and transmit the detection signal to the terminal in a wireless transmission manner. Further, when the frequency of the detection signal becomes larger, it indicates that the supply flow rate of the abrasive doped small steel balls is large, and sand is discharged from the sand-supply pipeline normally; when the frequency becomes smaller, it indicates that the supply flow rate of the abrasive doped small steel balls becomes smaller, and the sand conveying pipeline is blocked, and treatment is required.

In some examples of the present invention, as shown in FIGS. 1 to 4, the present invention provides a detection system for detecting the leakage in pipelines. The dyeing agent is input into the ultra-high pressure and ultra-large flow pump unit 2 from the dyeing-agent input port 22 of the pump unit through a water pump, the ratio of the displacement of the water pump to the displacement of the ultra-high pressure and ultra-large flow pump unit 2 is the same as the ratio of the dyeing agent to water, so that the dyeing agent can be fused according to the optimal proportion; and the dyeing agent and water can be quickly mixed by installing a stirring rod 23 in the ultra-high pressure and ultra-large flow pump unit 2. The dyeing-agent mixed liquid passes through the high-pressure water conveying pipeline 3, the multi-medium rotary center 4, the diversion valve block 5 and the water switch 8, and is finally conveyed to the water jet-shell knife combined cutter 6; if damage or leakage occurs somewhere during the period, colored residues are left, so that timely detection and leakage can be conveniently found, and personal injury and equipment damage caused by continuous pipeline fracture and joint disconnection can be avoided.

Figure 5:
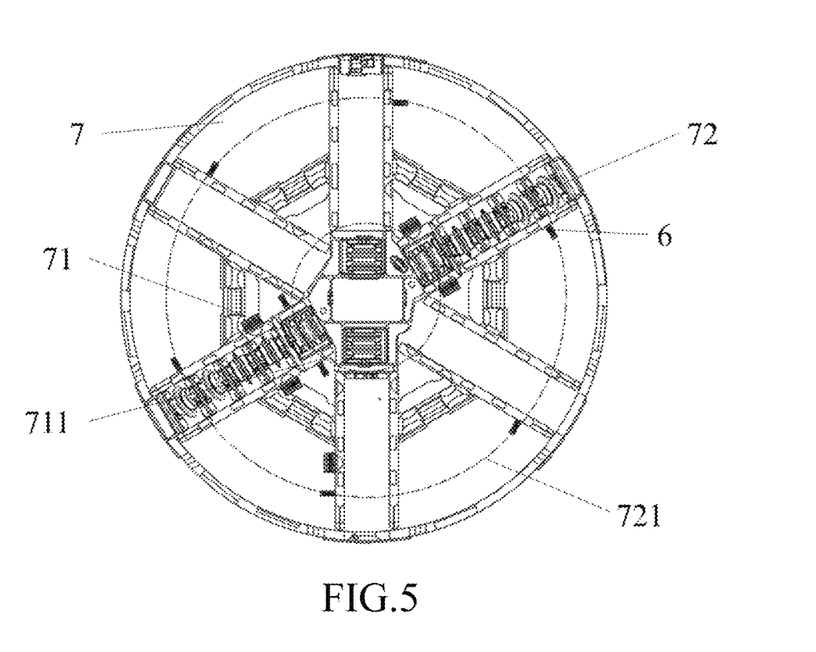
FIG. 5 is a schematic diagram of a structure of a water jet-mechanical combined cutter head shown in FIG. 1.

In some examples of the present invention, as shown in FIGS. 1 and 5, the water jet-mechanical combined cutter head 7 is mainly includes center cutters 71, edge cutters 72, and water jet-shell knife combined cutters 6. By fully considering the problem of cutter stress, rock-breaking efficiency and service life at different position of the water jet-mechanical combined cutter head 7, and in view of the fact that the cutter spacing of the center cutter 71 is relatively large, resulting in a significantly higher force on the cutter than at other positions, the water jet-shell knife combined cutters 6 are arranged along the arrangement trajectory 711 combined cutters in center position of the cutter head, and at this time, the cutting trajectory of the combined cutters 6 is the same as that of the center cutters 71, so as to achieve the purpose of improving the service life of the cutters. In view of the relatively small force on the edge cutters 72, the water jet-shell knife combined cutters 6 are arranged along the arrangement trajectory 721 of combined cutters in edge position of the cutter head, which is different from the cutting trajectory of each of the edge cutters 72, so as to achieve the purpose of improving the rock breaking efficiency of the cutter.

Specifically, some the water jet-shell knife combined cutters 6 located at the center position and the center cutters 71 may be arranged at the same concentric circle, and other the water jet-shell knife combined cutters 6 located at the edge may be arranged between concentric circles where the edge cutters 72 are located.

In order to further improve that rock-breaking efficiency of the water jet auxiliary mechanical cutter, the water jet-mechanical combine cutter head 7 is divided into a plurality of zones, each of the zones is respectively provide with a cutter pressure sensor for collecting and recording cutter pressure sensor signals when the TBM works. When the collected signal value is greater than a set value, the rotation angle of each of the zones of the water jet-mechanical combined cutter head 7 is automatically judged, at this moment, a corresponding water switch 8 positioned behind the water jet cutter bit 62 is opened, and the water jet cutter bit 62 emits high-pressure water jet; and in addition, the position where the cutter head of the full-section TBM is often damaged is obtained through an on-site measurement and statistical method, and a plurality of standby water jet-shell knife combined cutters 6 are additionally arranged at the position to prolong the service life of the water jet-mechanical combined cutter head 7.

In the present example, multiple combined rock breaking modes can be switched by changing the high-pressure water jet-mechanical matching mode; the multiple combined rock breaking modes include the followings:

(1) Mechanical tunneling-type rock breaking mode: the ultra-high pressure and ultra-large flow pump unit 2 stops working, so there is no high-pressure water conveyed to the multi-medium rotary center 4 in the high-pressure water conveying pipeline 3, the water jet-mechanical combined cutter head 7 rotates and propels, and rock breaking is carried out only by relying on mechanical cutters.

(2) Water jet cutting-type rock breaking mode: the ultra-high pressure and ultra-large flow pump unit 2 works and generates high-pressure water, the high-pressure water is conveyed to the multi-medium rotary center 4 through the high-pressure water conveying pipeline 3, then divided into required multi-path medium through the water jet diversion valve block 5, and then finally conveyed to the water jet-shell knife combined cutter 6 at the cutter head position. In addition, the water jet-mechanical combined cutter head 7 stops rotating and rock is cut only by water jet.

(3) High-pressure water jet-mechanical combined rock breaking mode: the ultra-high pressure and ultra-large flow pump unit 2 works and generates high-pressure water, the high-pressure water is conveyed to the multi-medium rotary center 4 through the high-pressure water conveying pipeline 3, then is divided into required multi-path medium through the water jet diversion valve block 5, and then is finally conveyed to the water jet-shell knife combined cutter 6 at the cutter head position. Simultaneously, the water jet-mechanical combined cutter head 7 rotates and propels, and the two rock breaking modes of high-pressure water jet cutting and mechanical cutter cutting both work, achieving the high-pressure water jet-mechanical combined rock breaking of the TBM.

In the above methods, different types of water jet cutter bit 62 can be replaced to change the energy distribution form of high-pressure water, such as high-pressure water jet, high-pressure abrasive water jet, pulsed water jet, cavitation jet, particle jet, slurry jet, etc. The ultra-high pressure and ultra-large flow pump unit 2 is controlled to output different rock breaking parameters of water jet, such as pressure of jet, flow rate, etc. In addition, the variety of high-pressure water jet-mechanical combined rock breaking modes can be adaptively selected and switched according to the tunneling environment to achieve optimal rock breaking benefits.

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

The invention claimed is:

1. A tunnel boring machine (TBM) equipped with a high-pressure water jet cutting system, comprising:
    a TBM body, wherein:
    a flow pump unit is arranged on the TBM body, and
    a high-pressure water jet cutting system is arranged at a front end of the TBM body;
    wherein:
    the high-pressure water jet cutting system comprises:
        a water jet-mechanical combined cutter head,
        a high-pressure water conveying pipeline,
        a multi-medium rotary center, and
        a water jet diversion valve block;
        wherein, a first end of the high-pressure water conveying pipeline is connected to the flow pump unit, and a second end of the high-pressure water conveying pipeline is connected to the multi-medium rotary center, the multi-medium rotary center is connected to the water jet diversion valve block, and a high-pressure water conveyed from the high-pressure water conveying pipeline is divided into multiple paths by the water jet diversion valve block;
    the water jet-mechanical combined cutter head comprises:
        a cutter head body,
        a plurality of center cutters, being arranged on a concentric circle centered on the cutter head body and close to a center of the cutter head body;
        a plurality of edge cutters, being arranged at an edge of the cutter head body; and
        a plurality of water jet-shell knife combined cutters, wherein:
            a first group of the plurality of the water jet-shell knife combined cutters is positioned on the concentric circle where the center cutters are arranged, and a cutting trajectory of the water jet-shell knife combined cutters of the first group is the same as that of the center cutters; and
            a second group of the plurality of the water jet-shell knife combined cutters is arranged close to an edge position of the cutter head body and is positioned at different positions from each of the edge cutters, and a cutting trajectory of the water jet-shell knife combined cutters of the second group is different from that of the each of the edge cutters;
    the multi-medium rotary center comprises a low-pressure medium rotary center; a water jet rotary joint is arranged coaxially with the low-pressure medium rotary center;

wherein:
    the water jet rotary joint comprises a fixed portion of the water jet rotary joint and a rotating portion of the water jet rotary joint; wherein the high-pressure water conveying pipeline is directly connected to the fixed portion of the water jet rotary joint, and the rotating portion of the water jet rotary joint is connected to the water jet diversion valve block; and
    each of the multiple paths of the high-pressure water is supplied to the each of the water jet-shell knife combined cutters.

2. The TBM equipped with the high-pressure water jet cutting system according to claim 1, wherein a each of the plurality of the water jet-shell knife combined cutters comprises:
    a shell knife,
    a water jet cutter bit, and
    a buffer material,
    wherein, a groove is provided inside the shell knife and an internal thread is provided; an external thread is provided in a cutter rod of the water jet cutter bit and is embedded in the shell knife, the shell knife and the water jet cutter bit are fixedly connected through the threads; and, a high-pressure water jet outlet of the water jet cutter bit is arranged at an end surface of the shell knife; and
    pores between shell knives and water jet cutter bits are filled with buffer materials.

3. The TBM equipped with the high-pressure water jet cutting system according to claim 1, wherein the low-pressure medium rotary center comprises a low-pressure medium input hole, a fixed portion of the low-pressure medium rotary center, a rotating portion of the low-pressure medium rotary center and a low-pressure medium conveying pipeline, where the fixed portion of the low-pressure medium rotary center is arranged outside the rotating portion of the low-pressure medium rotary center, a sealing ring is arranged therebetween and a relative rotation is allowed therebetween; the low-pressure medium input hole is opened at the fixed portion of the low-pressure medium rotary center and is configured for inputting external low-pressure medium; and, the low-pressure medium conveying pipeline is provided inside the rotating portion of the low-pressure medium rotary center and is configured for outputting low-pressure medium flowing through the low-pressure medium rotary center.

4. The TBM equipped with the high-pressure water jet cutting system according to claim 1, wherein an abrasive conveying system is connected to the rotating portion of the low-pressure medium rotary center, and the abrasive conveying system comprises a sand container, a connecting flange, a sand inlet, an air inlet, a sand discharge port and an abrasive conveying pipeline, where the sand container is sleeved on an outer side of the rotating portion of the low-pressure medium rotary center, a sealing ring is disposed between the sand container and the rotating portion of the low-pressure medium rotary center and a relative rotation is allowed between the sand container and the rotating portion of the low-pressure medium rotary center; another side of the sand container is fixedly connected to the fixed portion of the low-pressure medium rotary center through the connecting flange; the sand inlet and the air inlet are placed at a top end of the sand container and are respectively configured for adding abrasives to an interior of the sand container and balancing an air pressure; the sand discharge port is placed at a bottom of the sand container; and, the abrasive conveying pipeline is placed inside the rotating portion of the low-pressure medium rotary center, and one end of the abrasive conveying pipeline is connected to the interior of the sand container.

5. The TBM equipped with the high-pressure water jet cutting system according to claim 1, wherein the flow pump unit is driven by a variable-frequency motor whose rotation speed is able to be adjusted step by step; meanwhile, a pilot overflow valve is mounted at an outlet of the flow pump unit, wherein energizing firstly the pilot overflow valve for unloading before the flow pump unit is started, and de-energizing the pilot overflow valve for loading when the flow pump unit reaches preset pressure and flow values.

6. The TBM equipped with the high-pressure water jet cutting system according to claim 1, wherein a pressure gauge is provided on a water-supply pipeline of the water jet cutter bit, an induction coil assembly is provided on a sand-supply pipeline, and a wireless transmission module is connected to the induction coil assembly.

7. The TBM equipped with the high-pressure water jet cutting system according to claim 1, wherein comprising a dyeing-agent mixing device, the dyeing-agent mixing device is communicated with an inside of a water tank through a water pump and a connecting pipeline, and a ratio of a discharge of the water pump to a discharge of the flow pump unit is the same as a ratio of the dyeing agent to the water.

8. A combined tunneling method based on the TBM according to claim 1, comprising the following steps:
   according to a working condition, selecting and switching to a target one of rock breaking modes, wherein each of the rock breaking modes comprises:
   a mechanical tunneling-type rock breaking mode: the flow pump unit is not working, there is no high-pressure water being conveyed to the multi-medium rotary center in the high-pressure water conveying pipeline, the water jet-mechanical combined cutter head rotates and propels, to carry out a rock breaking only by mechanical cutters;
   a water jet cutting-type rock breaking mode: the flow pump unit works and generates the high-pressure water, the high-pressure water is conveyed to the multi-medium rotary center through the high-pressure water conveying pipeline, then is divided into required multi-path medium through the water jet diversion valve block, and then is conveyed to the each of the water jet-shell knife combined cutters at a cutter head position, the water jet-mechanical combined cutter head stops rotating, and carrying out the rock breaking only by water jet flows; and
   a high-pressure water jet-mechanical combined rock breaking mode: the flow pump unit works and generates the high-pressure water, the high-pressure water is conveyed to the multi-medium rotary center through the high-pressure water conveying pipeline, then is divided into the required multi-path medium through the water jet diversion valve block, and then is conveyed to the water jet-shell knife combined cutters at the cutter head position; the water jet-mechanical combined cutter head rotates and propels, carrying out the rock breaking by a mode of high-pressure water jet-mechanical combination; wherein,
changing an energy distribution form of the high-pressure water by replacing a water jet cutter bit, and adjusting rock breaking parameters of water jet flow by controlling the flow pump unit.

\* \* \* \* \*